(12) United States Patent
Kollep

(10) Patent No.: US 10,959,565 B2
(45) Date of Patent: Mar. 30, 2021

(54) PUMPING SYSTEM AND METHOD

(71) Applicant: NESTEC S.A., Vevey (CH)

(72) Inventor: Alexandre Kollep, Lutry (CH)

(73) Assignee: Societe des Produits Nestle S.A., Vevey (CH)

(*) Notice: Subject to any disclaimer, the term of this patent is extended or adjusted under 35 U.S.C. 154(b) by 305 days.

(21) Appl. No.: 15/765,604

(22) PCT Filed: Sep. 22, 2016

(86) PCT No.: PCT/EP2016/072609
§ 371 (c)(1),
(2) Date: Apr. 3, 2018

(87) PCT Pub. No.: WO2017/060096
PCT Pub. Date: Apr. 13, 2017

(65) Prior Publication Data
US 2019/0075963 A1    Mar. 14, 2019

(30) Foreign Application Priority Data

Oct. 6, 2015   (EP) .................................... 15188494

(51) Int. Cl.
| | | |
|---|---|---|
| *A47J 31/46* | (2006.01) | |
| *A47J 31/44* | (2006.01) | |
| *A47J 31/54* | (2006.01) | |

(52) U.S. Cl.
CPC ......... *A47J 31/468* (2018.08); *A47J 31/4403* (2013.01); *A47J 31/465* (2013.01); *A47J 31/54* (2013.01)

(58) Field of Classification Search
CPC .... A47J 31/468; A47J 31/4403; A47J 31/465; A47J 31/54
See application file for complete search history.

(56) References Cited

U.S. PATENT DOCUMENTS

| 5,636,563 A | 6/1997 | Oppermann et al. | |
|---|---|---|---|
| 2007/0186780 A1* | 8/2007 | Clark ...................... | A47J 31/32 99/275 |

FOREIGN PATENT DOCUMENTS

| CN | 2792368 Y | 7/2006 |
|---|---|---|
| CN | 201026127 Y | 2/2008 |

(Continued)

OTHER PUBLICATIONS

Machine Translation of WO02080746A1 by Greiwe Hansdieter. "Coffee Machine" (Year: 2002).*

(Continued)

*Primary Examiner* — David P Bryant
*Assistant Examiner* — Nirvana Deonauth
(74) *Attorney, Agent, or Firm* — K&L Gates LLP

(57) ABSTRACT

Pumping system (100) for a beverage preparation device comprising a reservoir (10) for storing a liquid; pumping means (30) for pumping the liquid from the reservoir (10) to a beverage preparation means (50) of the beverage preparation device; and pressurizing means (20) for injecting air in the system (100); wherein the pumping system (100) further comprises one motor (40) driving both the pumping means (30) and the pressurizing means (20); the system further comprising engaging means (60) configured to engage or disengage the pumping means (30) as a function of the direction of rotation of the motor (40). The invention further refers to a pumping method for use in a beverage preparation device.

15 Claims, 8 Drawing Sheets

(56) References Cited

FOREIGN PATENT DOCUMENTS

| CN | 101380198 A | 3/2009 |
|---|---|---|
| CN | 101528095 A | 9/2009 |
| CN | 101744541 A | 6/2010 |
| CN | 101959446 A | 1/2011 |
| CN | 202960133 U | 6/2013 |
| CN | 203280249 U | 11/2013 |
| EP | 0781520 A1 | 7/1997 |
| WO | 02080746 | 10/2002 |
| WO | 2014187837 | 11/2014 |
| WO | 16880752014187837 | 11/2014 |

OTHER PUBLICATIONS

English Translation of Chinese Office Action for Chinese Patent Appl. No. 201680059125.9 dated Nov. 5, 2019.

\* cited by examiner

PUMPING SYSTEM AND METHOD

CROSS REFERENCE TO RELATED APPLICATIONS

The present application is a National Stage of International Application No. PCT/EP2016/072609, filed on Sep. 22, 2016, which claims priority to European Patent Application No. 15188494.7, filed on Oct. 6, 2015, the entire contents of which are being incorporated herein by reference.

FIELD OF THE INVENTION

The present invention is directed to a pumping system and to a pumping method for a beverage preparation means. In particular, the invention is directed to a pumping system and to a pumping method for pumping a preheated liquid from a reservoir into a beverage preparation means.

BACKGROUND OF THE INVENTION

Various pumping systems used in beverage preparation means are known in the state of the art, in particular pumping systems for pumping liquid from a reservoir to a beverage preparation means.

Known pumping systems comprise a reservoir where a liquid is contained: the liquid therein is pumped and then later heated through a heater before being provided into the beverage preparation means. However, when an already preheated liquid could be efficiently pumped, the beverage production in these means would be carried out much faster and the devices would be compact and smaller, particularly indicated for mobility or on the go applications.

Mobility is a new driver in hot beverages, for example coffee. To have a coffee on the go, possibly in a car or in a public transport, the power available to heat and pump water is limited. Thus it is necessary to pump hot water, which is not usually done in household appliances, so less parts are needed, therefore saving space, allowing the machines be smaller and less costly.

However, when a hot liquid is pumped from a preheated reservoir, the suction pressure generated by the pump can lead to the phenomenon of cavitation at the pump entrance. The phenomenon of cavitation occurs due to the pumped liquid evaporating at the lowered pressure, and inevitably leads to a decrease of the pumping performance. In order to avoid the cavitation phenomenon, the absolute suction pressure generated by the pump needs to be increased. Thanks to the pressure increase, the phenomenon of cavitation can be avoided or at least reduced at the pump entrance, leading to a recovery in pumping performance at high liquid temperatures. The aim would be to provide a pumping performance of the pump with the preheated liquid which is similar to the pumping performance of this pump with the same liquid at ambient temperature.

In known prior art systems, two pumps are used; one for pumping air and another one for pumping hot water: these two pumps do not work simultaneously as air pressure needs to be built in the water tank first, before hot water is pumped so as to avoid cavitation problems. Once you start pumping the hot water, the water volume in the hot water tank needs to be replaced by air, maintaining the overpressure, thus the air pump needs to run as hot water is pumped from the tank. Therefore, in these systems of the known prior art, two pumps (air and water) and used, each pump being driven by a motor, thus two pumps and two motors are used. As a consequence, these systems require more space and are more costly, which makes them not appropriate for mobility or on the go applications.

It is the object of the present invention to improve the state of the art. Thereby, it is an object of the present invention to overcome the above-mentioned disadvantages. In particular, the present invention aims to provide a pumping system for a beverage preparation means that is able to pump a hot liquid from a preheated reservoir without any significant decrease in pumping performance, suppressing the phenomenon of cavitation at the pump entrance, the system being configured for maintaining at the same time a reduced space and being cost efficient.

OBJECT AND SUMMARY OF THE INVENTION

According to a first aspect, the invention refers to a pumping system for a beverage preparation device comprising a reservoir for storing a liquid, pumping means for pumping the liquid from the reservoir to a beverage preparation means of the beverage preparation device, and pressurizing means for injecting air in the system. The pumping system further comprises one motor driving both the pumping means and the pressurizing means. The system further comprises engaging means configured to engage or disengage the pumping means as a function of the direction of rotation of the motor.

The pressurizing means can inject air into the reservoir in order to pressurize it or can inject air into the beverage preparation means.

Preferably, the engaging means is a free wheel unit arranged in the pumping means. More preferably, the engaging means is a free wheel unit arranged outside and directly linked to the pumping means.

Typically, the engaging means are further configured to engage or disengage the pressurizing means also as a function of the direction of rotation of the motor.

Preferably, the engaging means can further comprise a free wheel unit arranged in the pressurizing means.

According to the invention, the pumping means is typically a hot water pump, preferably a piston pump. Typically, the pressurizing means is an air pump, preferably a piston pump.

Preferably, the motor in the pumping system of the invention is a direct current (DC) motor. Typically, the reservoir is a thermos.

Also, the reservoir can be a low pressure boiler supporting a pressure of about 1 to 3 bar.

According to the invention, the reservoir is preferably configured to heat the liquid to a temperature preferably up to about 40° C., more preferably of up to about 90° C. or more.

According to a second aspect, the invention refers to a pumping method for use in a beverage preparation device comprising: pressurizing a reservoir with pressurizing means; optionally heating a liquid in the reservoir; pumping the liquid from the reservoir to a beverage preparation means of the beverage preparation device by using a single motor driving both the pumping means and the pressurizing means, the pumping means being engaged or disengaged as a function of the direction of rotation of the motor.

Typically, the pressurizing means are further engaged or disengaged as a function of the direction of rotation of the motor in the system of the invention.

Preferably, the liquid is heated to about 90° C. or more, and the reservoir is pressurized to an absolute pressure of about 0.7 to 1.0 bars, according to the present invention.

Yet according to a third aspect, the invention refers to a pumping method for use in a beverage preparation device comprising: optionally heating a liquid in a reservoir; first pumping the liquid from the reservoir to a beverage preparation means of the beverage preparation device in order to prepare the beverage; then injecting air into the beverage preparation means for emptying its content; such that one single motor is used driving both the pumping means and the pressurizing means, both the pumping means and the pressurizing means being engaged or disengaged as a function of the direction of rotation of the motor.

Preferably, the liquid is heated to a maximum temperature of about 40° C.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

The above-mentioned objects of the present invention are solved by the attached independent claims. The main idea of the present invention is to provide a pumping system for a beverage preparation means, which is able to pump a hot liquid from a reservoir, the reservoir being preferably pressurized. The pumping system is configured to work without any significant decrease in pumping performance, suppressing the phenomenon of cavitation at the pump entrance, and being configured for maintaining at the same time a reduced space and being cost efficient.

The dependent claims develop further advantages of the present invention.

The liquid can for instance be water, milk, soup, water-based liquid, chocolate-based liquid, coffee-based liquid, milk-based liquid, or the like. In particular, the liquid can be any liquid that is suitable for preparing a warm or hot beverage.

In the present invention, the terms hot water pump or water pump and air pump are used: however, the invention shall not be limited to such pumps, but also to any type of pumps. The water pump 30 is preferably a piston pump, but can be any other suitable pump for pumping liquid. The air pump 20 is also preferably a piston pump, but can be any other type of pump which is suitable for pumping air.

Figure 1:
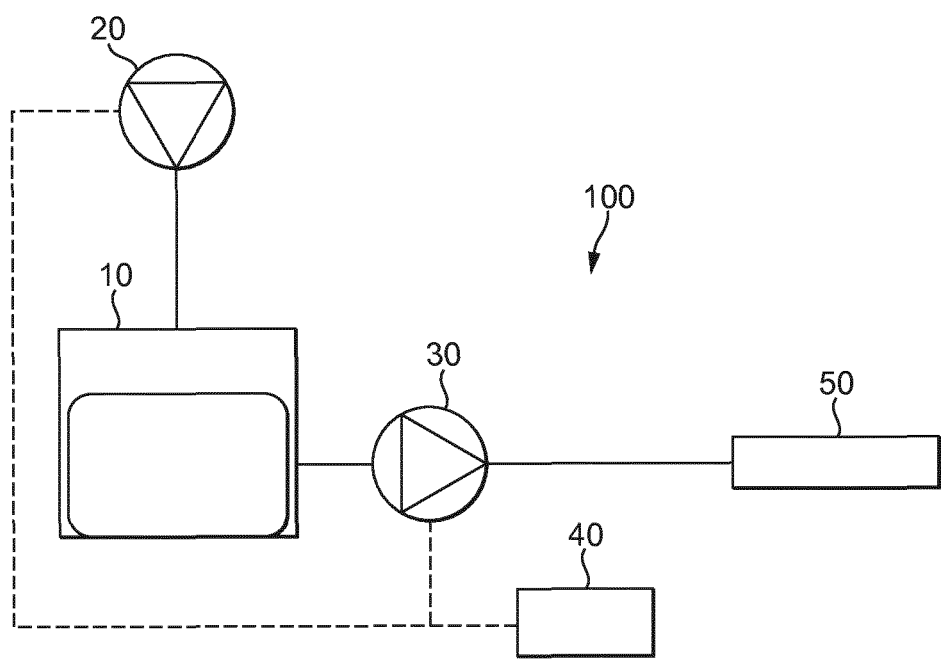
FIG. 1 shows a schematic view of a pumping system according to the present invention.

As shown in FIG. 1 (the pumping system is represented as a fluidic system, this is the reason why the lines to the motor 40 are dashed), the pumping system 100 of the invention comprises a reservoir 10 for storing and optionally heating a liquid, an air pump 20 and a hot water pump 30, both driven by a direct current motor 40. The system 100 is able to pump the liquid from the reservoir 10 preferably to at least a beverage preparation means 50. The beverage preparation means 50 can be for example a brewing unit in a beverage preparation device, such as a coffee machine, for example, or can be configured as a capsule used in the preparation of a beverage, in a beverage preparation machine preferably, though not necessary.

The pumping system 100 of the invention uses two pumps, a hot water pump 30 and an air pump 20, both pumps being driven by the same motor 40, preferably a direct current motor. This solution therefore requires less space and costs less than traditional solutions using two pumps and two motors, so it is particularly suitable for mobility and on the go solutions.

In the system 100, the air pump 20 starts pumping air into the reservoir 10 in order to pressurize it. Once the liquid inside the reservoir 10 is pressurized, the hot water pump 30 starts pumping liquid from the reservoir 10 to the beverage preparation means 50: the air pump 20 continues at the same time pumping air into the reservoir 10 (while the hot water pump 30 pumps liquid to the beverage preparation means 50) so that it is maintained pressurized. By pressurizing the reservoir, the phenomenon of cavitation can be avoided or at least reduced at the hot water pump entrance. This leads to a recovery in pumping performance at high liquid temperatures (preferably, as it will be explained later in more detail, the liquid pumped by the hot water pump 30 from the reservoir 10 is both pressurized and heated). By pressurization, the cavitation phenomenon is avoided; by the liquid being preheated when pumped, the beverage production is carried out faster and more efficiently and, particularly, no heater downstream of the hot water pump is necessary, which is particularly advantageous for mobile beverage preparation devices, which can be built more compact and with less weight.

Figure 2:
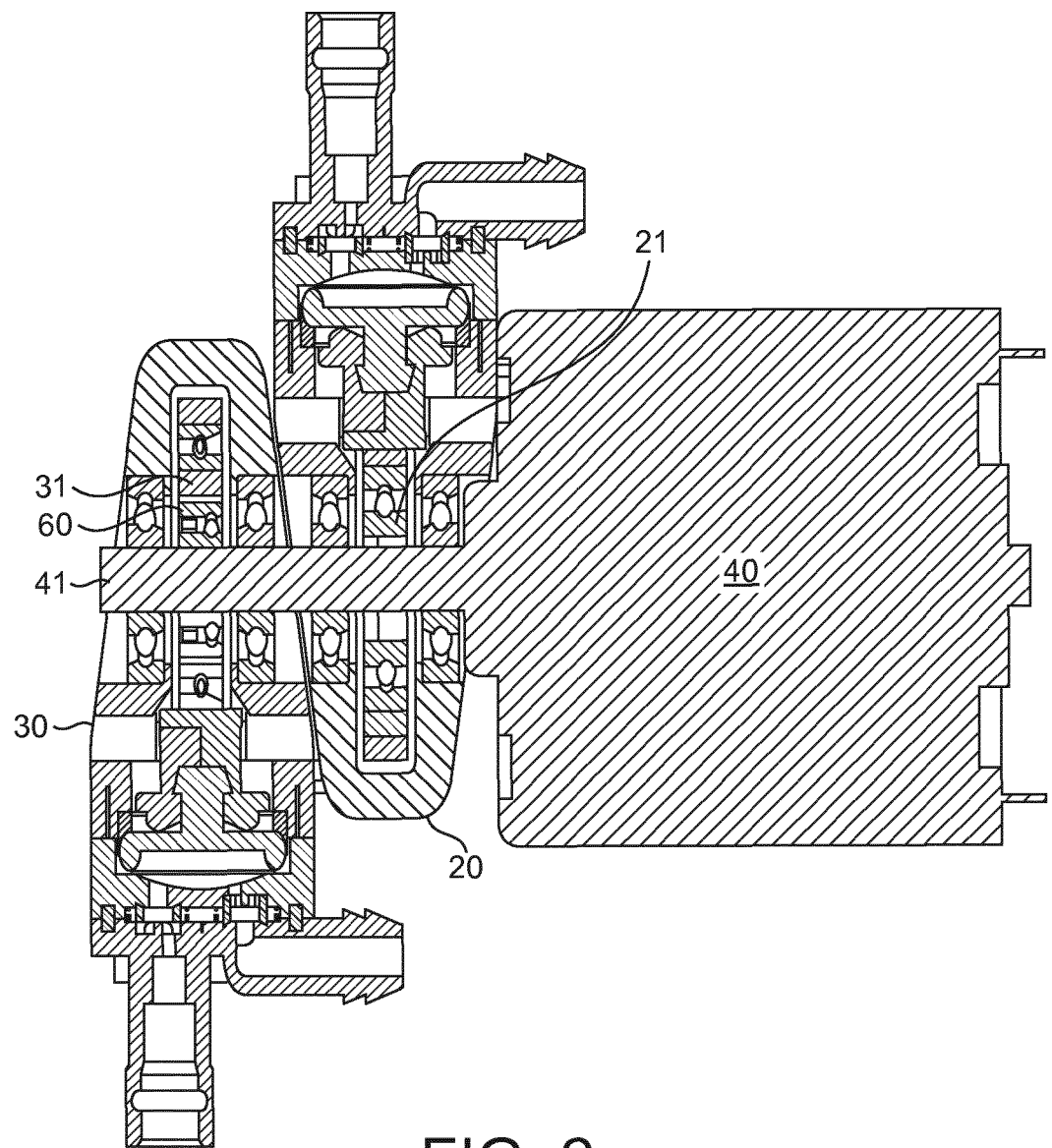
FIG. 2 shows a detailed view of the hot water pump and the air pump driven by a direct current motor, in a pumping system according to the present invention.
Figure 3:
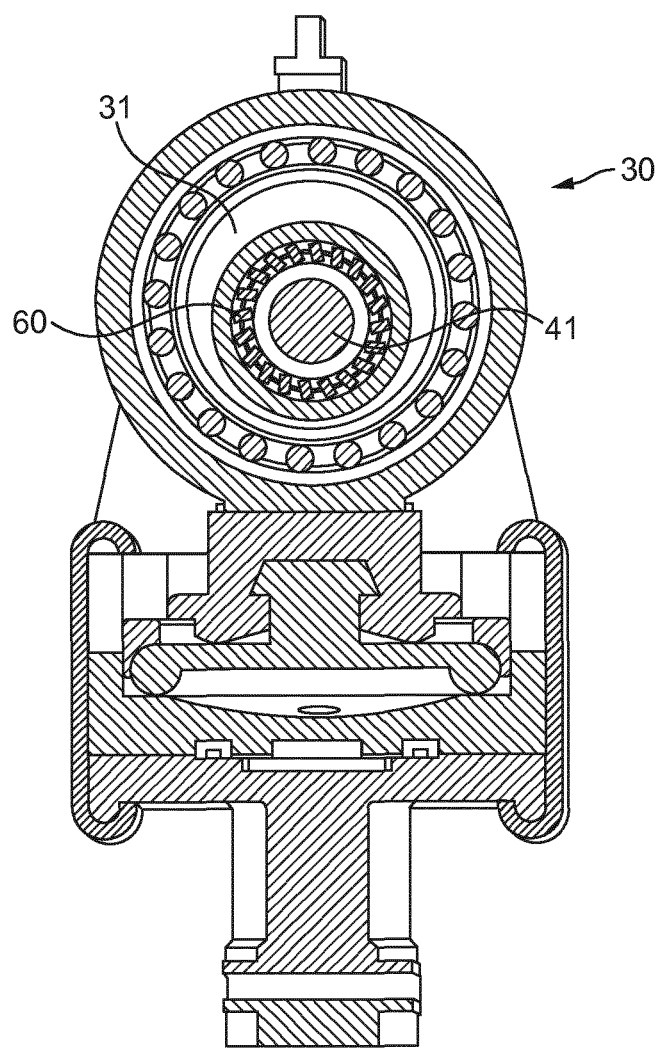
FIG. 3 shows a detailed view of the hot water pump comprising an eccentric and a free wheel unit, in a pumping system according to the present invention.
Figure 4:
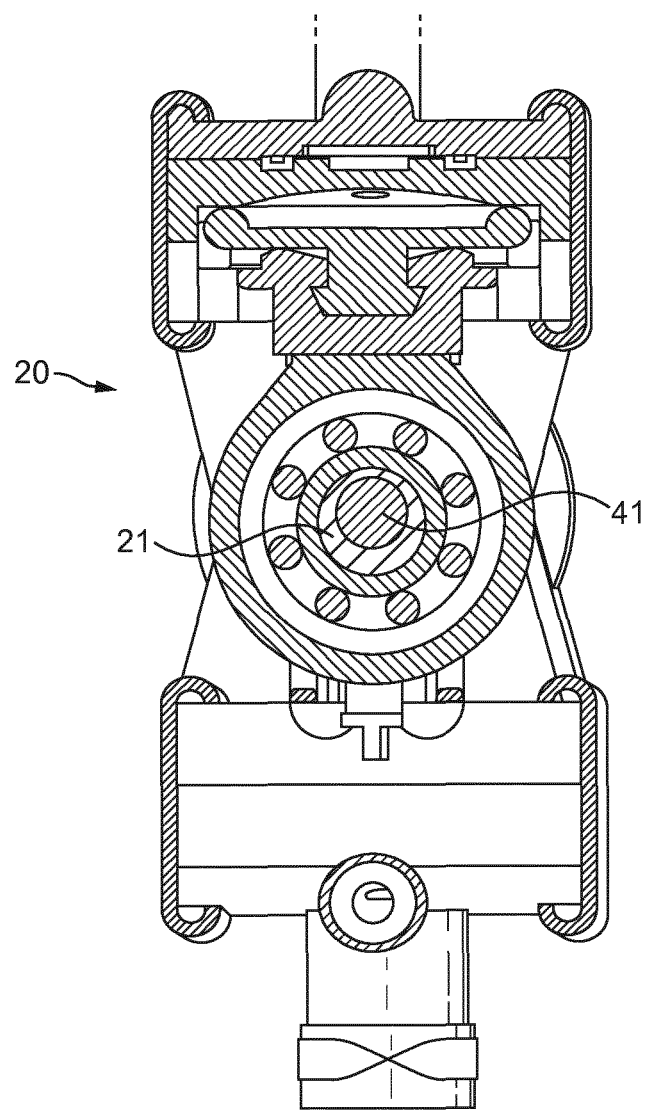
FIG. 4 shows a detailed view of the air pump comprising an eccentric in a pumping system according to the present invention.
Figure 5A:
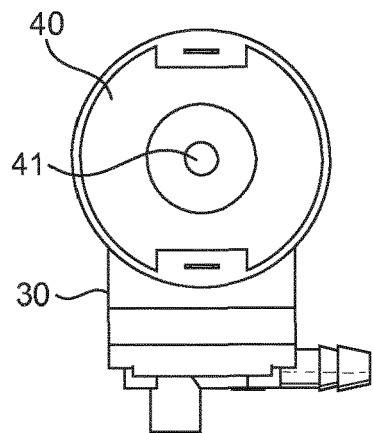
FIGS. 5a-e show another possible embodiment of the pumping system of the invention, where the free wheel unit is arranged externally and directly linked to the hot water pump.
Figure 5B:
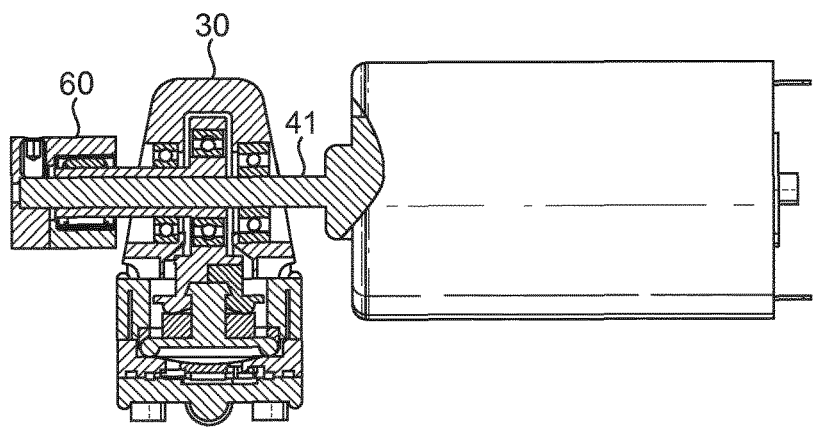
Figure 5C:
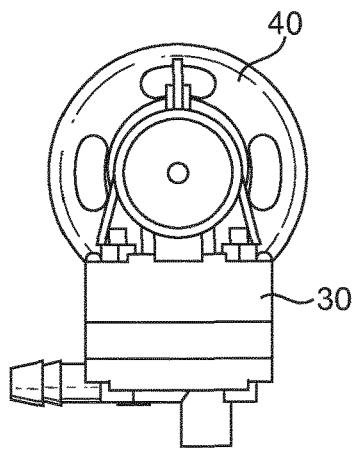
Figure 5D:
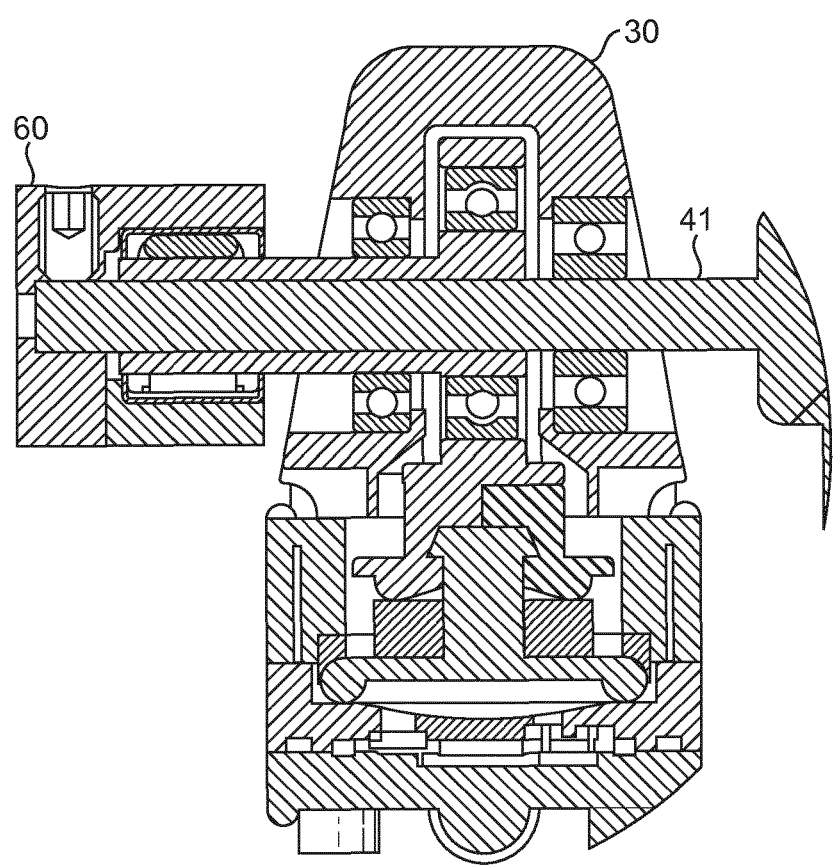
Figure 5E:
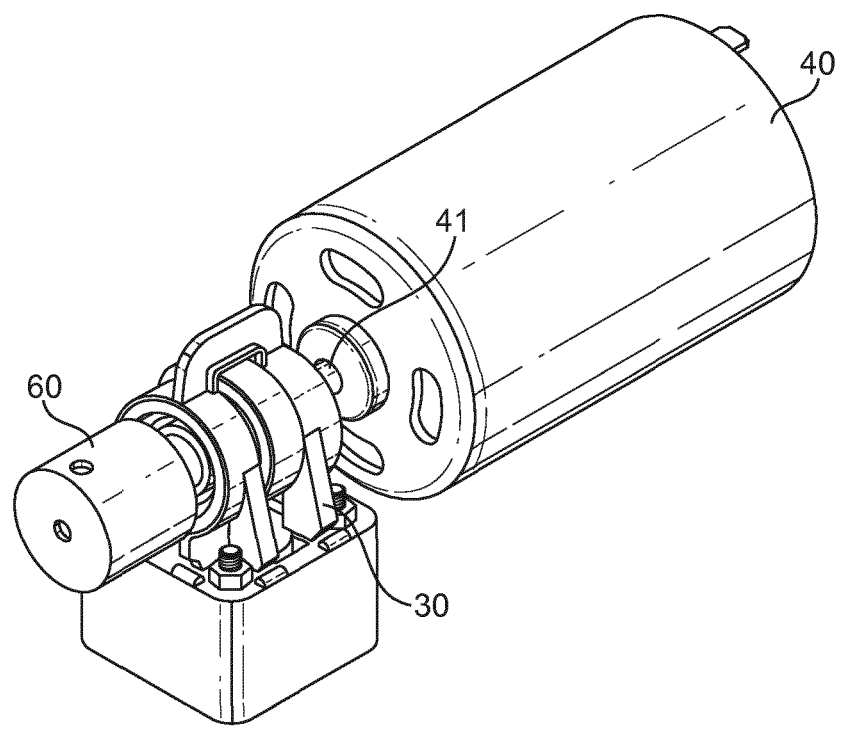

In order to allow that first only the air pump 20 works and then both pumps (hot water pump 30 and air pump 20) work simultaneously, a free wheel unit 60 is typically provided in the hot water pump 30, as shown for example in FIG. 2 or 3. The free wheel unit 60 in the hot water pump 30 allows this pump 30 to be in use when the motor turns in one direction, and not pumping when turning in the opposite direction. In the main applications of the system 100 of the invention, only one free wheel unit 60 is needed, as air needs to be pumped every time the motor 40 turns (in order to maintain the reservoir 10 continuously pressurized).

The direct current (DC) motor 40 in the system 100 of the invention allows that, when its polarity is changed, its direction of rotation changes as well, which directly allows that either only the air pump 20 is running or both pumps (air and water, 20 and 30) are running simultaneously when one free wheel unit 60 is arranged in the hot water pump 30.

The free wheel unit 60 is a transmission device that allows the engagement or disengagement of the unit where it is arranged (in this case, of the hot water pump 30) depending on the direction of rotation of the drive shaft 41, rotated by the motor 40 and engaging both pumps, 20 and 30.

As represented in FIG. 2, the free wheel unit 60 is typically arranged in the hot water pump 30. However, it is also possible, as shown in any of FIGS. 5a-e, that the free wheel unit 60 is arranged externally to the hot water pump 30.

The free wheel unit 60 is placed between the drive shaft 41 in the hot water pump 30 and the water pump eccentric 31 that generates the displacement needed for pumping (typically, when the hot water pump 30 is a piston pump). When the direction of rotation of the shaft 41 is such that the free wheel unit 60 is engaged (blocked), the pump eccentric 31 turns and generates the pumping action of pump 30. If the rotation is inversed, the free wheel unit 60 slips so the pump eccentric 31 does not turn and no pumping action is generated by the pump 30.

Typically, as represented for example in FIG. 2, the air pump 20 is configured as a piston pump, and comprises an air pump eccentric 21 generating the displacement needed for the pumping of air in pump 20.

As already described, another embodiment is also possible as represented in any of FIGS. 5a-e: in this embodiment, the free wheel unit 60 is not arranged in the hot water pump 30 (as shown in FIG. 2), but outside of it and directly linked to it. This embodiment is particularly advantageous from an industrial point of view, as making the free wheel 60 small enough so that it is correctly integrated in the hot water pump 30 is costly, so this embodiment would represent a less costly solution, from the manufacturing side.

Preferably, according to the invention, the air pump 20 is configured to pressurize the reservoir 10 to an absolute pressure of about 0.5 to 1.0 bars, preferably 0.7 to 1.0 bars. With these preferred pressure values an absolute pressure (pressure drop at the pump suction side) which is higher than the vapor pressure is achieved before the actual water pump entrance, which suppresses the phenomenon of cavitation very effectively at temperatures of liquid typically of 90° C. or 94° C. The preferred values take into account all pressure losses in the liquid circuit between the reservoir and the hot water pump 30, for example, valves, flow-meters, tubes or the like.

The pumping system 100 can be preferably designed for a mobile beverage preparation device. The reservoir 10 can be designed as a thermos: in this case, the liquid is heated before it is filled into the reservoir, and maintains its temperature in the thermos so that it is pumped hot.

Also, the reservoir can comprise heating means, able to actively heat the liquid inside the reservoir before it is pumped. In this case, the reservoir 10 will be equipped with active heating means for heating the liquid, for example, a heating coil, a heating foil or the like. The reservoir 10 can further be equipped or connected to a control unit (not shown) suitable to control at least the liquid temperature in the reservoir 10. The air pump 20 can be controlled by the control unit.

The reservoir can be a thermos and can further comprise heating means, for example, such that the heating means can be activated when the system is connected to electricity (in a docket station, for example) and then the liquid can be kept hot by the thermos configuration, so the liquid is pumped hot. The reservoir 10 can also not be a thermos, neither can any heating means, for embodiments where the liquid is not needed to be heated (explained later) or because other heating means are provided in the system 100, separated from the reservoir. However, the preferred embodiments of the invention are those where no heater downstream of the water pump 30 is necessary, for the system 100 being compact and being designed for a mobile beverage preparation device.

When talking of the liquid being heated, its temperature is raised up to about 90° C. or more, typically with a maximum flow rate of about 100 to 300 ml/min at a maximum output pressure of respectively about 14 to 3 bars. Preferably, the reservoir 10 is a low pressure boiler or tank withstanding a pressure of about 1 to 3 bar. When no unlimited power for heating is available in portable or on-the-go applications, the liquid pumped from the reservoir needs to be already suitable for beverage production; therefore, it needs to be pumped already heated, as previously described.

That means, the water pump 30 is able to pump a 90° liquid, e.g. water, with a minimum flow rate of 100 ml/min at a maximum output pressure of 14 bar and with a maximum flow rate of 300 ml/min at a minimum output pressure of 3 bars. With such a pump, various kinds of beverages (some beverages requiring only low output pressures but high flow-rates, other beverages requiring high output pressures but only low flow-rates) can be produced quickly, due to the preheated liquid being pumped.

Another possible embodiment of the pumping system 100 of the present invention (not shown in the Figures) would be to have two free wheel units, one in the air pump 20 and another one in the hot water pump 30. With such configuration, the air pump 20 would be running when the hot water pump 30 would be freewheeling (i.e. disengaged from the drive shaft 41) and the hot water pump 30 would be running when the air pump 20 would be freewheeling. Therefore, with this configuration, by inversing the polarity on the DC motor 40, either air or hot water can be selected and activated (thus, there is no possibility to have both air and water pumped simultaneously).

Such a configuration would be particularly interesting in cases, for example, where the beverage preparation means 50 would be configured as a capsule, the system 100 providing hot water to the capsule for the production of the beverage and then, the hot water would be stopped and air would be injected into the capsule in order to empty its content and finalise the beverage preparation. Therefore, the air pump 20 would be freewheeling first and then, motor polarity would be inverted and it would be the hot water pump 30 the one freewheeling.

When the liquid pumped by the water pump 30 is heated (typically, as already mentioned, to a temperature of up to about 90° C. or 94° C.), in order to avoid cavitation at the pump entrance, the pressure drop of the liquid at the pump suction side (from the reservoir 10 to the pump 30) would need to be of about 0.5 to 1.0 bars, preferably 0.7 to 1.0 bars. Therefore, the reservoir 10 is pressurized by the air pump 20 before any liquid is pumped and continues to be pressurized during all the time when water is pumped.

Figure 6:
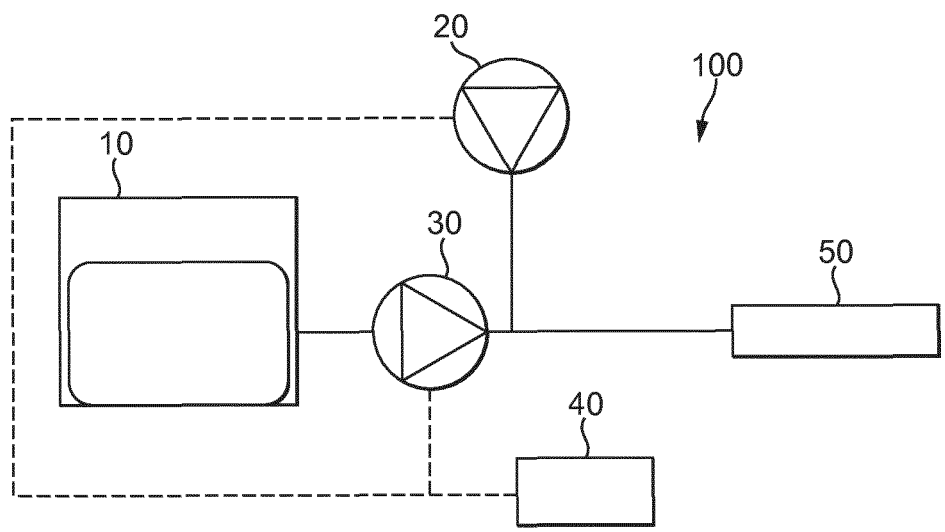
FIG. 6 shows a schematic view of a pumping system according to another embodiment of the present invention.

However, in applications as the one described, where first water is pumped into the beverage preparation means 50 and then later air is pumped into these means 50 in order to empty them, air is not pressurizing the reservoir 10 but is injected directly into the beverage preparation means 50, as represented in FIG. 6 (the fluidic system is represented, so the lines to the motor are dashed). Typically in these cases, water at the entrance of the water pump 30 is at a lower temperature (typically of about 40° C.) so no cavitation problem is encountered and the reservoir 10 needs not be pressurized.

According to a second aspect, the invention is further directed to a pumping method for use in a beverage preparation means. When the embodiment shown in FIG. 1 is used, the method comprises the steps of: preferably heating the liquid in a reservoir 10, pressurizing the reservoir 10 with air from an air pump 20, pumping the liquid (typically previously heated) from the reservoir 10 to a beverage preparation means 50 of a beverage preparation device, with a hot water pump 30.

When the embodiment represented in FIG. 6 is used for the pumping system 100 of the invention, then the method comprises the steps of: preferably heating the liquid in the reservoir 10, first pumping the liquid (typically previously heated) from the reservoir 10 to a beverage preparation means 50 of a beverage preparation device with a water pump 30 and then pumping air in the beverage preparation means 50 with an air pump 20.

Although the present invention has been described with reference to preferred embodiments thereof, many modifications and alternations may be made by a person having ordinary skill in the art without departing from the scope of this invention which is defined by the appended claims.

The invention claimed is:

1. A pumping system for a beverage preparation device, the pumping system comprising:
a reservoir for storing a liquid;
a pump for pumping the liquid from the reservoir to a beverage preparation member of the beverage preparation device;
a pressurizing member for injecting air in the pumping system;
the pumping system further comprises one motor driving both the pump and the pressurizing member; and
a free wheel unit arranged in the pump and configured to engage or disengage the pump as a function of a direction of rotation of the motor.

2. The pumping system according to claim 1 wherein the pressurizing member injects the air into the reservoir in order to pressurize the reservoir.

3. The pumping system according to claim 1 wherein the pressurizing member injects the air into the beverage preparation member.

4. The pumping according to claim 1, wherein the free wheel unit is further configured to engage or disengage the pressurizing member also as a function of the direction of rotation of the motor.

5. The pumping system according to claim 1, wherein the pump is a hot water pump.

6. The pumping system according to claim 1, wherein the pressurizing member is an air pump.

7. The pumping system according to claim 1, wherein the motor is a direct current motor.

8. The pumping system according to claim 1, wherein the reservoir is a thermos.

9. The pumping system according to claim 1, wherein the reservoir is a low pressure boiler supporting a pressure of 1 to 3 bar.

10. The pumping system according to claim 1, wherein the reservoir is configured to heat the liquid.

11. A pumping method for use in a beverage preparation device, the pumping method comprising:
providing a pumping system comprising:
a reservoir for storing a liquid,
a pump for pumping the liquid from the reservoir to a beverage preparation member of the beverage preparation device,
a pressurizing member for injecting air in the pumping system,
a single motor driving both the pump and the pressurizing member, and
a free wheel unit arranged in the pump and configured to engage or disengage the pump as a function of the direction of rotation of the motor,
the pumping method further comprising the steps of:
pressurizing the reservoir with the pressurizing member;
heating the liquid stored in the reservoir; and
pumping the liquid from the reservoir to the beverage preparation member of the beverage preparation device by using the single motor driving both the pump and the pressurizing member, the pump being engaged or disengaged, by the free wheel unit arranged in the pump, as a function of the direction of rotation of the single motor.

12. The pumping method according to claim 11, wherein the pressurizing member is further engaged or disengaged as a function of the direction of rotation of the single motor.

13. The pumping method according to claim 11, wherein the liquid is heated to 90° C. or more, and the reservoir is pressurized to an absolute pressure of 0.7 to 1.0 bars.

14. A pumping method for use in a beverage preparation device, the pumping method comprising:
providing a pumping system comprising:
a reservoir for storing a liquid,
a pump for pumping the liquid from the reservoir to a beverage preparation member of the beverage preparation device,
a pressurizing member for injecting air in the pumping system,
a single motor driving both the pump and the pressurizing member, and
a free wheel unit arranged in the pump and configured to engage or disengage the pump as a function of the direction of rotation of the motor,
the pumping method further comprising the steps of:
pumping the liquid stored in the reservoir from the reservoir to the beverage preparation member of the beverage preparation device in order to prepare a beverage; and
then injecting air into the beverage preparation member by the pressurizing member for emptying content of the beverage preparation member,
such that the single motor is used driving both the pump and the pressurizing member, both the pump and the pressurizing member being engaged or disengaged, by the free wheel unit arranged in the pump, as a function of the direction of rotation of the motor.

15. The pumping method according to claim 14, wherein the liquid is heated to a maximum temperature of 40° C.

* * * * *